(12) United States Patent
Ho (10) Patent No.: US 7,441,477 B2
(45) Date of Patent: Oct. 28, 2008

(54) GEARSHIFT FORK ASSEMBLY FOR A MOTOR VEHICLE

(75) Inventor: Chao-Chang Ho, Fongshan (TW)

(73) Assignee: Kwang Yang Motor Co., Ltd, Kaohsiung (TW)

( * ) Notice: Subject to any disclaimer, the term of this patent is extended or adjusted under 35 U.S.C. 154(b) by 0 days.

(21) Appl. No.: 11/699,409

(22) Filed: Jan. 30, 2007

(65) Prior Publication Data

US 2007/0261511 A1  Nov. 15, 2007

(30) Foreign Application Priority Data

Apr. 28, 2006  (CN) .............................. 95 1 15210

(51) Int. Cl.
  *B60K 20/00* (2006.01)
(52) U.S. Cl. .................. 74/473.37; 74/473.38
(58) Field of Classification Search ............... 74/473.1, 74/473.36, 473.37, 339, 337.5, 473.29; 192/82 R
  See application file for complete search history.

(56) References Cited

U.S. PATENT DOCUMENTS

| | | | | |
|---|---|---|---|---|
| 4,449,416 | A | * 5/1984 | Huitema | 74/336 R |
| 4,509,385 | A | * 4/1985 | Inui et al. | 74/473.1 |
| 4,529,080 | A | * 7/1985 | Dolan | 192/109 A |
| 4,621,537 | A | * 11/1986 | Piazza et al. | 74/473.24 |
| 4,770,280 | A | * 9/1988 | Frost | 192/53.343 |
| 4,920,815 | A | * 5/1990 | Reynolds | 74/335 |
| 5,573,096 | A | * 11/1996 | Erlebach | 192/110 R |
| 5,743,147 | A | * 4/1998 | Gazyakan | 74/473.25 |
| 6,122,983 | A | * 9/2000 | Hoffman | 74/337.5 |
| 6,234,038 | B1 | * 5/2001 | Loeffler | 74/473.37 |
| 6,450,057 | B1 | * 9/2002 | Winkler et al. | 74/473.37 |
| 6,619,153 | B2 | * 9/2003 | Smith et al. | 74/473.37 |

FOREIGN PATENT DOCUMENTS

JP  55-163365  * 12/1980

* cited by examiner

*Primary Examiner*—Richard W L Ridley
*Assistant Examiner*—Matthew Johnson
(74) *Attorney, Agent, or Firm*—Bacon & Thomas, PLLC (57) ABSTRACT

A gearshift fork assembly is mounted on a shaft for a gearshift fork in a gearbox of a motor vehicle and comprises a hollow body, a gearshift fork, a sleeve and a resilient member. The hollow body is put on the shaft and comprises a first engagement section formed on its outer surface. The gearshift fork comprises a ring at one end, and the ring is put on one end of the hollow body and includes a second engagement section on its inner surface. The second engagement section is adapted to mesh with the first engagement section. The sleeve is put on the other end of the hollow body and comprises a third engagement section formed on its inner surface. The third engagement section is adapted to mesh with the first engagement section. The resilient member is biased between the ring and the sleeve.

4 Claims, 11 Drawing Sheets

GEARSHIFT FORK ASSEMBLY FOR A MOTOR VEHICLE

FIELD OF THE INVENTION

The present invention relates to gearshift of motor vehicle and more particularly to an improved gearshift fork assembly mounted on a shaft for gearshift fork in a gearbox of a motor vehicle (e.g., automobile).

BACKGROUND OF THE INVENTION

Figure 1:
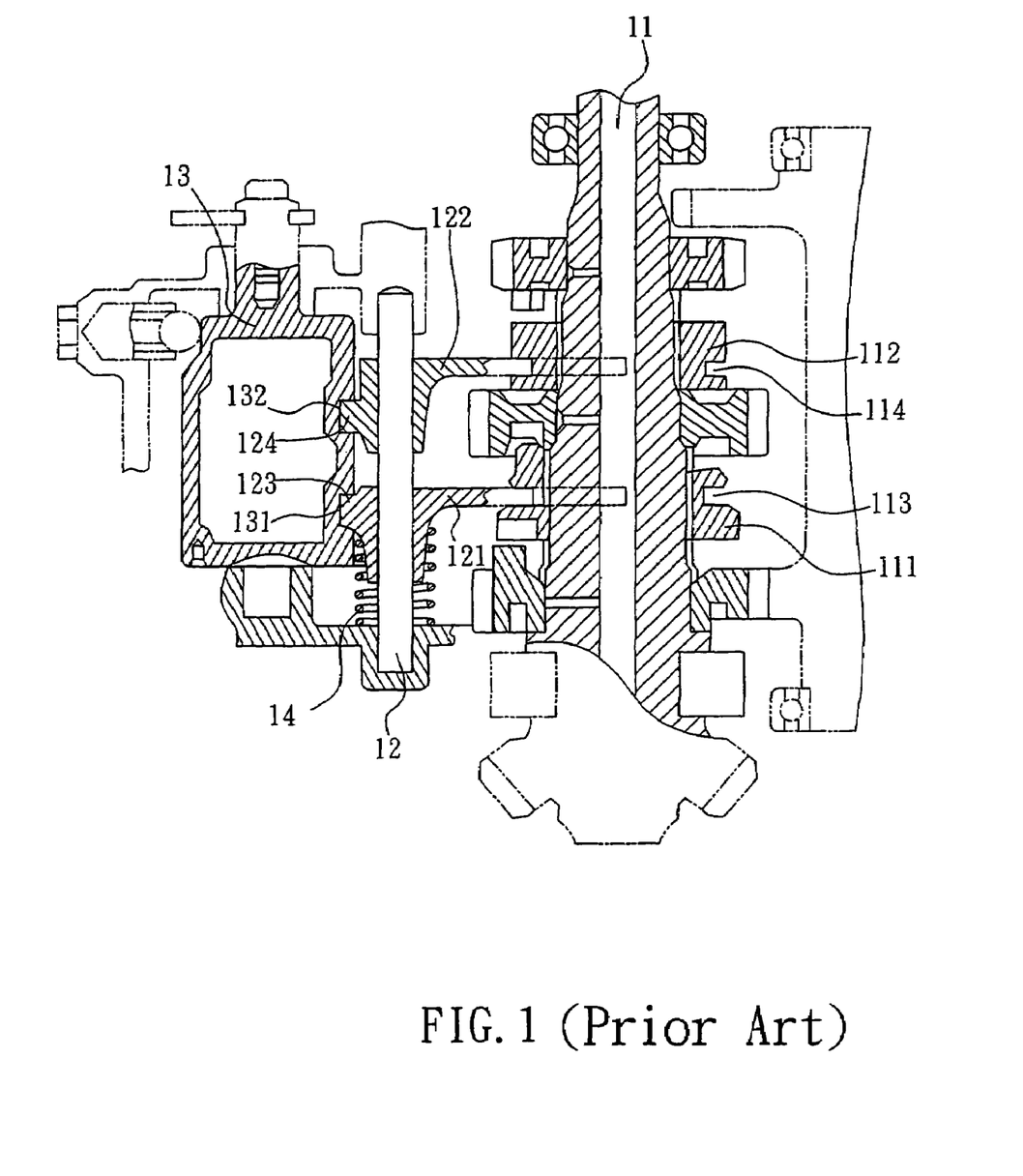
FIG. 1 is a sectional view of a conventional gearshift in a gearbox of a motor vehicle.

A conventional gearshift in a gearbox of a motor vehicle (e.g., automobile) for rough terrain is shown in FIG. 1. The gearshift comprises an output shaft 11, a shaft for gearshift fork 12, and a speed changing case 13. The output shaft 11 comprises a first sliding block 111 and a second sliding block 112. A first groove 113 is provided on the first sliding block 111 and a second groove 114 is provided on the second sliding block 112 respectively. The shaft for gearshift fork 12 comprises a first gearshift fork 121 having one end fitted in the first groove 113, and a second gearshift fork 122 having one end fitted in the second groove 114 respectively. A first positioning peg 123 is formed at the other end of the first gearshift fork 121 and a second positioning peg 124 is formed at the other end of the second gearshift fork 122 respectively. A first trough 131 and a second trough 132 are formed on an outer surface of the speed changing case 13 and are disposed corresponding to the first positioning peg 123 and the second positioning peg 124 respectively. Thus, the first positioning peg 123 is adapted to fit in the first trough 131 and the second positioning peg 124 is adapted to fit in the second trough 132 respectively. By configuring as above, the shaft for gearshift fork 12 may slide in response to sliding the speed changing case 13. As an end, the purpose of shifting gears is achieved.

Figure 2:
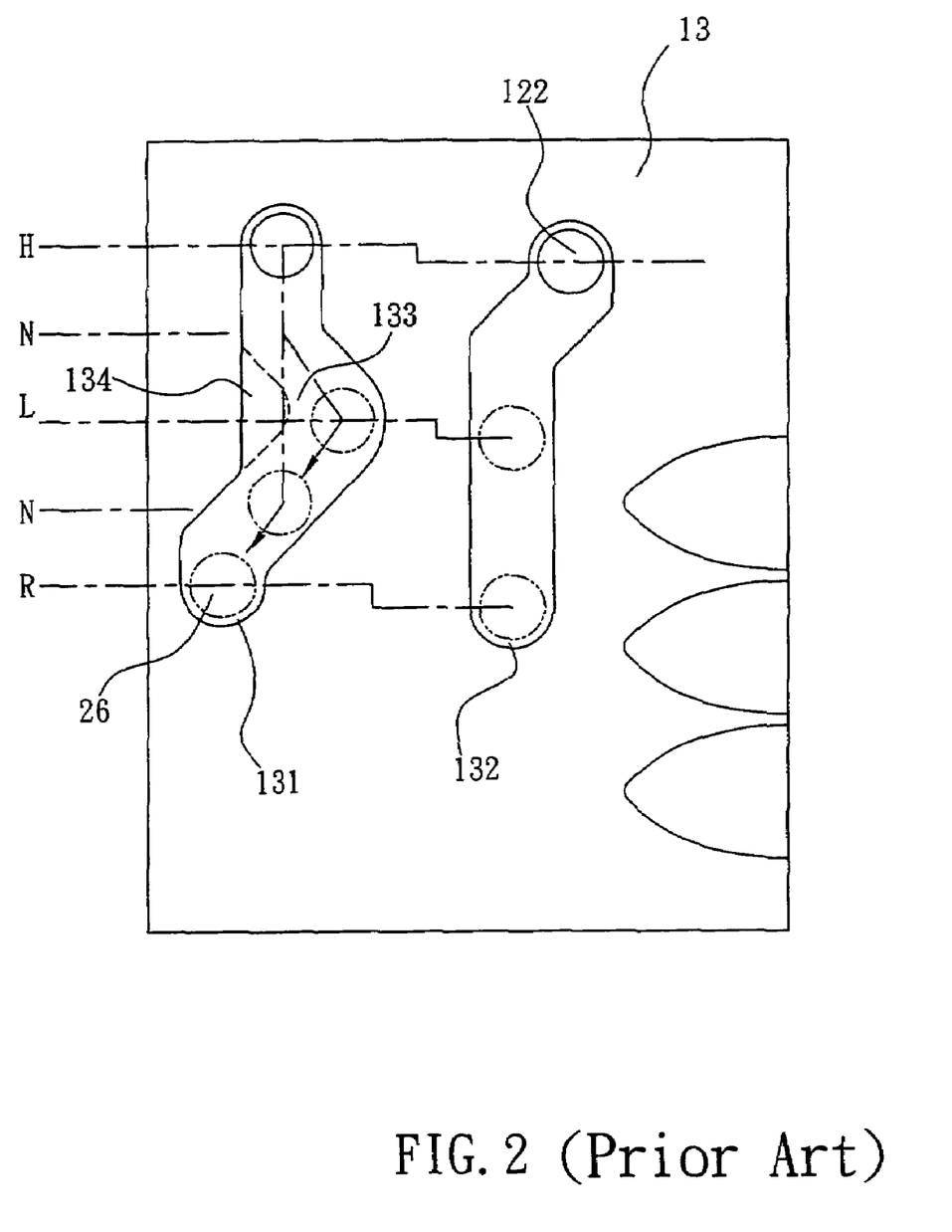
FIG. 2 a schematic plan view of the speed changing case in the gearshift of FIG. 1.

For causing the gearshift to smoothly change from a reverse gear (R) to a drive gear (H) or from a drive gear (H) to a reverse gear (R), a spring 14 is put on a cylindrical portion projecting from one side of the first gearshift fork 121. A groove machining process is performed on the first trough 131 of the speed changing case 13 as illustrated in FIG. 2. As shown FIGS. 1 and 2, dash line 133 indicates a state of the first trough 131 prior to the groove machining process, and solid line 134 indicates a state of an additional groove being formed in the first trough 131 by the groove machining process. A portion of the first trough 131 indicated by the solid line 134 is straight. Also, the spring 14 is adapted to exert an elastic force. As such, a change from a reverse gear (R) to a drive gear (H) or from a drive gear (H) to a reverse gear (R) is made quick and smooth via an overdrive gear (L). As an end, shifting gears is facilitated.

While the above configuration is able to facilitate shifting gears, it is disadvantageous for requiring the additional groove machining process in forming the first trough 131 since it can complicate the process, increase the manufacturing time, and greatly increase the manufacturing cost. Further, the spring 14 is not engaged with the main body of the first gearshift fork 121. Furthermore, an elastic force exerted by the spring 14 may hinder a mounting of both the spring 14 and the first gearshift fork 121 on the shaft for gearshift fork 12, resulting in time consuming of the assembly process. For eliminating the additional groove machining process in forming the first trough 131 and facilitating the mounting of both the spring 14 on the first gearshift fork 121 of the shaft for gearshift fork 12, a gearshift of a motor vehicle for rough terrain is developed by some manufacturers of the art as shown in FIG. 1. The gearshift likewise comprises an output shaft 11, a shaft for gearshift fork 12, and a speed changing case 13. The shaft for gearshift fork 12 comprises a first gearshift fork 121 and a second gearshift fork 122 both of them adapted to move together with the speed changing case 13. Further, the output shaft 11 comprises a first sliding block 111 assembled with the first gearshift fork 121, and a second sliding block 112 assembled with the second gearshift fork 122 so as to facilitate shifting gears.

Figure 3:
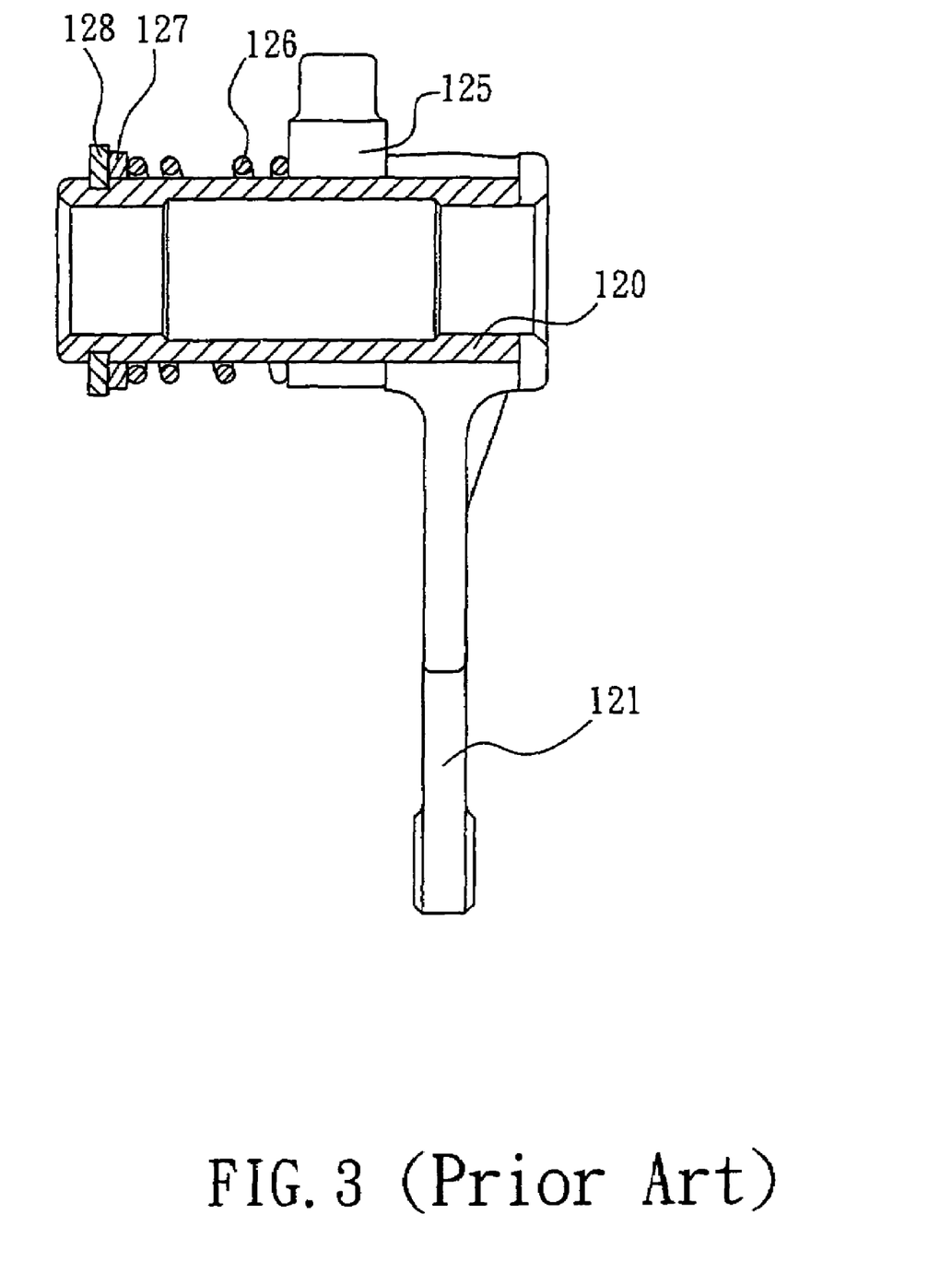
FIG. 3 is a sectional view of the first gearshift fork of FIG. 1.

Referring to FIG. 3, the first gearshift fork 121 is put on an outer surface of a sleeve 120 at one end. On the outer surface of the sleeve 120 from the first gearshift fork 121 to the other end of the sleeve 120, there are provided a guide block 125, a spring 126, a washer 127, and a positioning member 128 sequentially. The guide block 125 is extended to fit in the first trough 131 on the speed changing case 13 such that both the guide block 125 and the first trough 131 are adapted to slide together. The additional groove machining process in forming the first trough 131 is thus eliminated due to the conformed shape of the guide block 125 opposite the first gearshift fork 121. Further, positioning member 128 is fastened at the other end of the sleeve 120. As such, the guide block 125, the spring 126, and the washer 127 are securely put on the sleeve 120. Thus, an elastic force exerted by the spring 126 is prohibited from hindering a mounting of the first gearshift fork 121 on the shaft for gearshift fork 12, resulting in a facilitation of the assembly process with time being saved.

Figure 4:
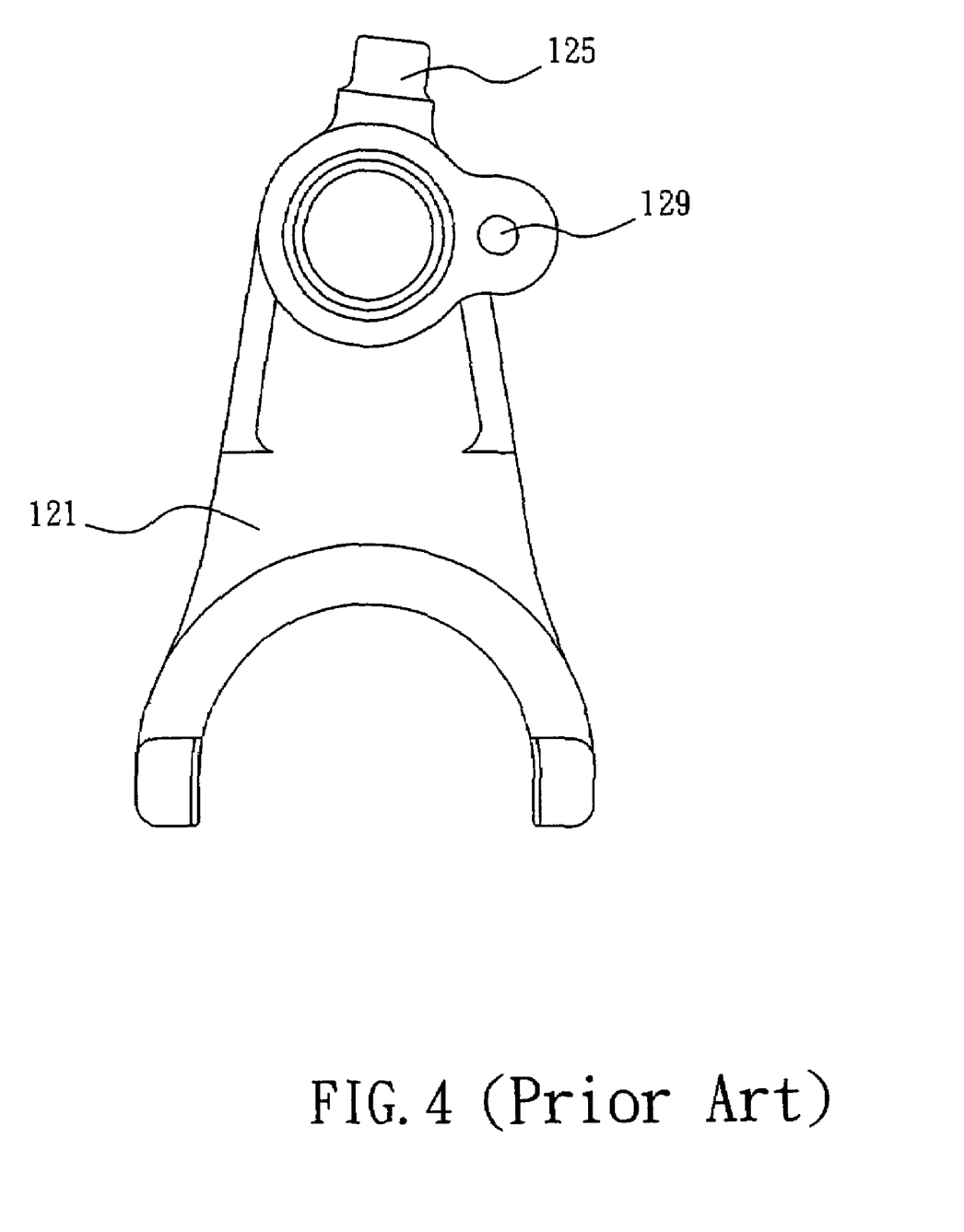
FIG. 4 is a side plan view of the first gearshift fork of FIG. 1.
Figure 5:
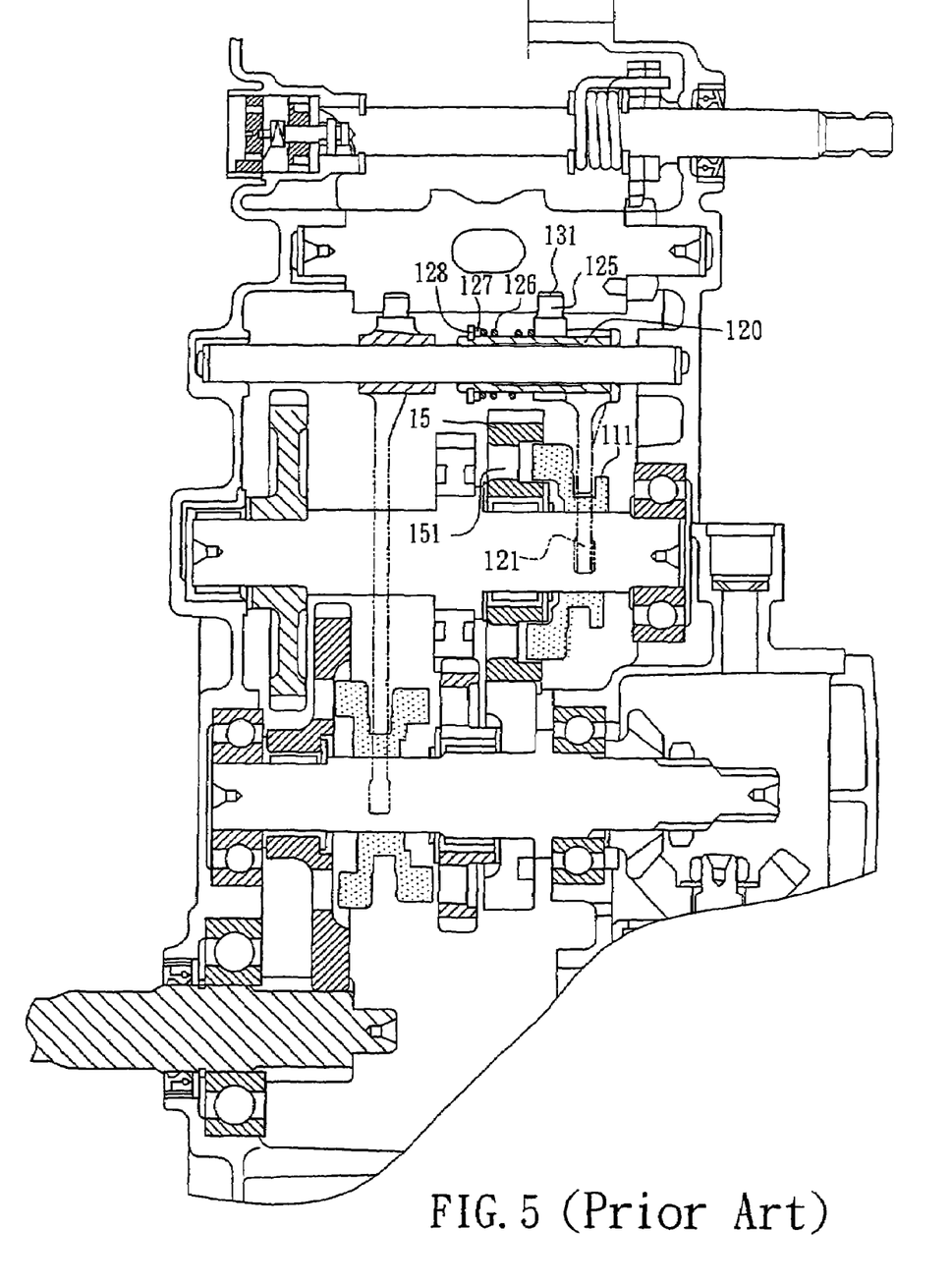
FIG. 5 is another sectional view of the conventional gearshift in the gearbox where the gearshift is in drive gear.

Referring to FIG 4, for further facilitating the gearshift a positioning pin 129 is provided on the first gearshift fork 121 facing the guide block 125. The positioning pin 129 is also located on the sleeve 120 proximate to the guide block 125. Referring to FIG 5, a state of the speed changing case 13 in a drive gear (H) is shown. The spring 126 is compressed by the guide block 125 when the first sliding block 111 does not travel to enter into the groove 151 of a drive gear 15. As such, the guide block 125 slides over the positioning pin 129 until the first sliding block 111 enters into the groove 151 of the drive gear 15. To the contrary, the spring 126 is not compressed by the guide block 125 when the first sliding block 111 enters into the groove 151 of the drive gear 15 smoothly. By providing the positioning pin 129 as above, it is possible to configure the gearshift to smoothly shift gears from the overdrive gear (L) to the reverse gear (R) or vice versa.

However, for the gearshift shifting gears requires waiting the guide block 125 to slide over the positioning pin 129 until the first sliding block 111 smoothly enters into the groove 151 of the drive gear 15. The waiting is a relatively long time. Further, the first gearshift fork 121 and the guide block 125 move due to the provision of the positioning pin 129. However, these components put on the sleeve 120 are prone to loosening after a period time of use. As a result, the components tend to be damaged. Furthermore, a smooth speed change is not possible because force exerted thereon is unbalanced. And in turn, it may cause jamming. All of the above drawbacks may bring great inconvenience to users. Thus, continuing improvements in the exploitation of gearshift fork for a motor vehicle are constantly being sought.

SUMMARY OF THE INVENTION

After considerable research and experimentation, a gearshift fork assembly for a motor vehicle according to the present invention has been devised so as to overcome the above drawbacks of the prior art gearshift including the first gearshift fork and other associated components being prone to loosening and being damaged, unbalanced exerted force, not smooth speed change, easy jam, and great inconvenience to users.

It is an object of the present invention to provide a gearshift fork assembly mounted on a shaft for a gearshift fork in a gearbox of a motor vehicle, the gearshift fork assembly comprising a hollow body, a gearshift fork, a sleeve, and a resilient member. The hollow body is put on the shaft for gearshift fork, the hollow body comprising a first engagement section formed on its outer surface. The gearshift fork comprises a ring at one end, the ring put on one end of the hollow body, the ring including a second engagement section on its inner surface, the second engagement section adapted to mesh with the first engagement section. The sleeve is put on the other end of the hollow body, the sleeve comprising a third engagement section formed on its inner surface, the third engagement section adapted to mesh with the first engagement section. The resilient member is biased between the ring and the sleeve. By utilizing this gearshift fork assembly, shifting gears is facilitated since the gearshift fork, the sleeve, and the hollow body are fastened together.

It is another object of the present invention to provide means for facilitating the fastening of the gearshift fork, the sleeve, and the hollow body wherein the first engagement section comprises a plurality of grooves extended from one end of the hollow body to the other end thereof. The second engagement section comprises of a plurality of projections extended from one end of the ring to the other end thereof, the projections adapted to fit in a portion the grooves. The third engagement section comprises a plurality of protrusions extended from one end of the sleeve to the other end thereof, the protrusions adapted to fit in an opposite portion of the grooves. Therefore, a structural strength of the gearshift fork assembly is greatly increased. Moreover, by configuring the gearshift fork assembly as above, shifting gears is facilitated since the both the protrusions and the projections are fitted in the grooves.

The above and other objects, features and advantages of the present invention will become apparent from the following detailed description taken with the accompanying drawings.

DETAILED DESCRIPTION OF THE PREFERRED EMBODIMENTS

Figure 6:
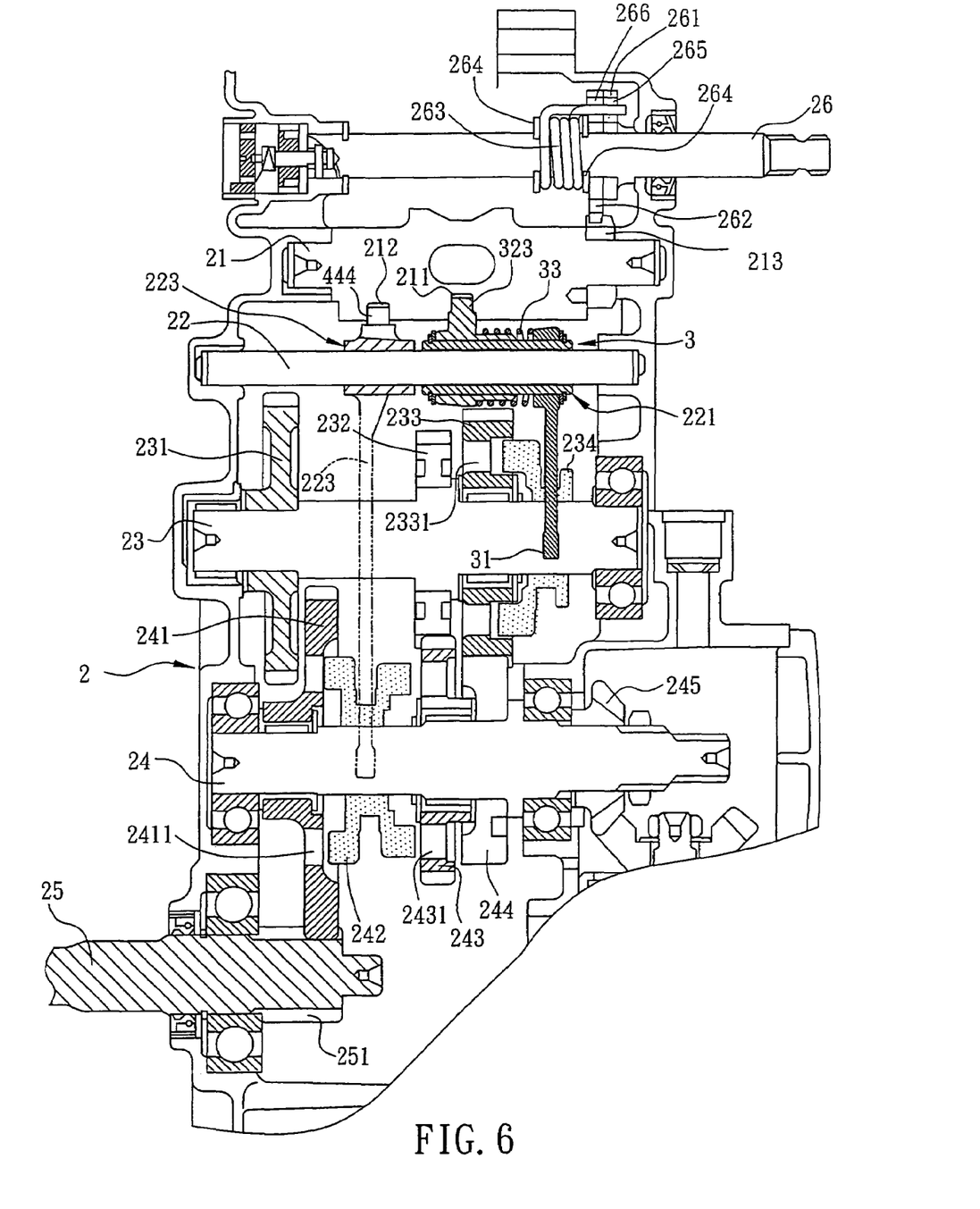
FIG. 6 is a sectional view of a gearshift in a gearbox according to the invention where the gearshift is in drive gear.

Referring to FIG. 6, a gearbox 2 incorporated a gearshift of the invention is shown. The gearbox 2 comprises a speed changing case 21, a shaft for gearshift fork 22, a drive shaft 23, a linking shaft 24, and a driven shaft 25. The speed changing case 21 comprises a first groove 211 and a second groove 212. The shaft for gearshift fork 22 comprises a first gearshift fork section 221 and a second gearshift fork section 223. One ends of the first gearshift fork section 221 and the second gearshift fork section 223 facing the speed changing case 21 are fitted in the first groove 211 and the second groove 212 respectively. The drive shaft 23 comprises a first gear 231, an acceleration gear 232, a drive gear 233, and a first sliding block 234 in which the first sliding block 234 and the first gearshift fork section 221 are adapted to move together. The linking shaft 24 comprises a reverse gear 241, a second sliding block 242, a linking gear for acceleration 243, a linking gear for drive 244, and a drive bevel gear 245. The drive gear 233 is meshed with the linking gear for drive 244. The linking gear for acceleration 243 is meshed with the acceleration gear 232. The second gearshift fork section 223 and the first sliding block 242 are adapted to move together. The driven shaft 25 comprises a transmission gear 251 at one end, the transmission gear 251 being meshed with the reverse gear 241. The drive gear 233 is idle relative to the drive shaft 23 when the gearbox 2 is in an idle state and the drive shaft 23 is rotating. Both the reverse gear 241 and the linking gear for acceleration 243 are idle when the linking shaft 24 is rotating.

In the above gearbox construction, the gearshift further comprises a gearshift lever 26. The gearshift lever 26 is provided in the gearbox 2 proximate the speed changing case 21. On a surface of the gearshift lever 26 there are provided a fixing plate 261, a drive gear 262, two positioning clamps 264, and a spring 263. The fixing plate 261 is provided at one side of the gearshift lever 26 and is adapted to co-rotate with the gearshift lever 26. The drive gear 262 is sandwiched between the fixing plate 261 and the proximal positioning clamp 264. The spring 263 is compressed between the two positioning clamps 264. Two ends of the spring 263 are fitted in a hole 265 of the fixing plate 261 after passing a hole 266 of the drive gear 262 aligned with the hole 265. Thus, the fixing plate 261 and the drive gear 262 are adapted to act as a whole due to the provision of the spring 263. A driven gear 213 provided on the speed changing case 21 may turn in response to the action of both the fixing plate 261 and the drive gear 262. And in turn, the speed changing case 21 may turn. As a result, movements of the first gearshift fork section 221 and the second gearshift fork section 223 are adapted to cause the first sliding block 234 and the second sliding block 242 to slide for shifting gears.

Figure 7:
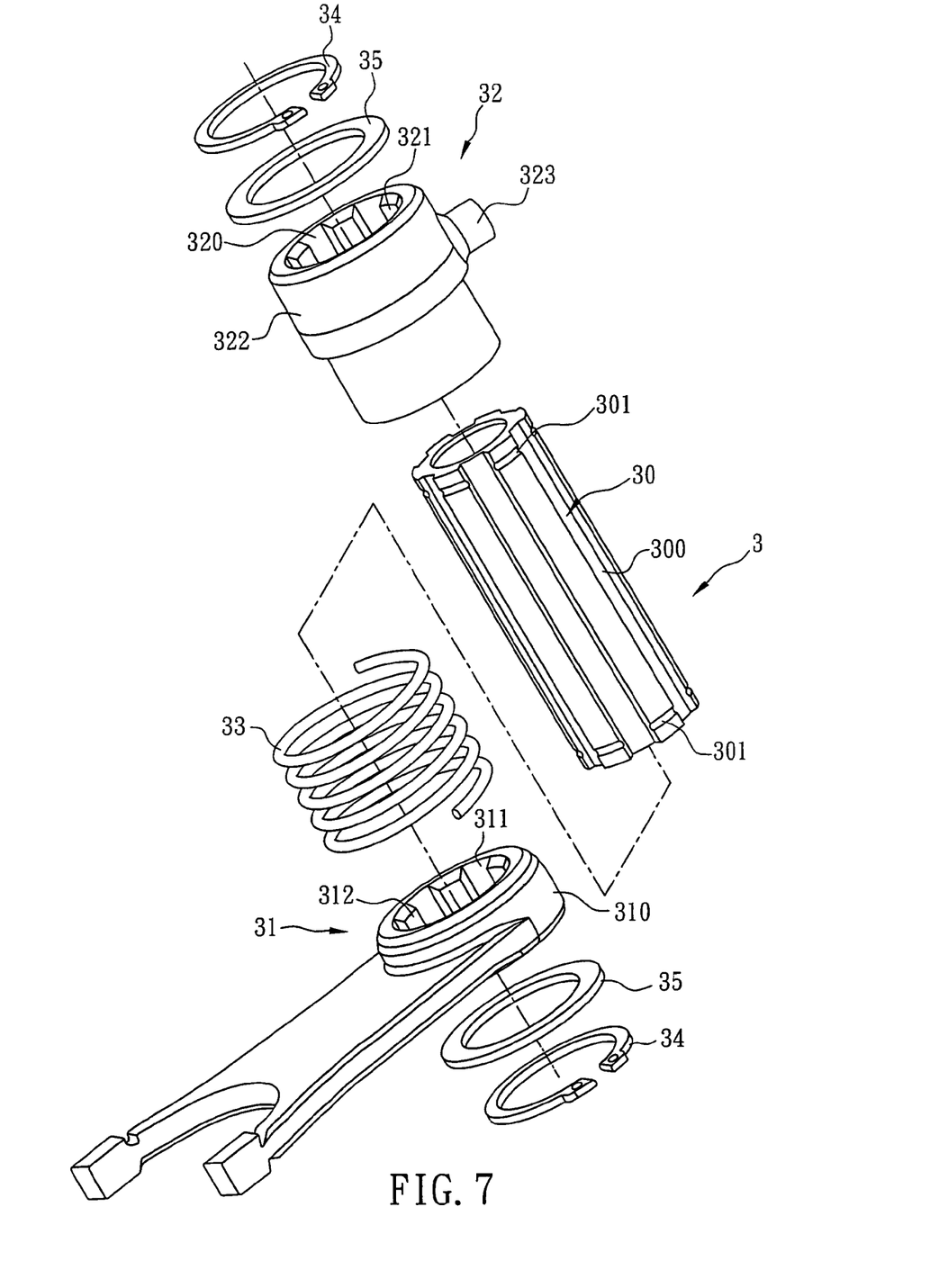
FIG. 7 is an exploded view of the gearshift fork assembly according to the invention.
Figure 8:
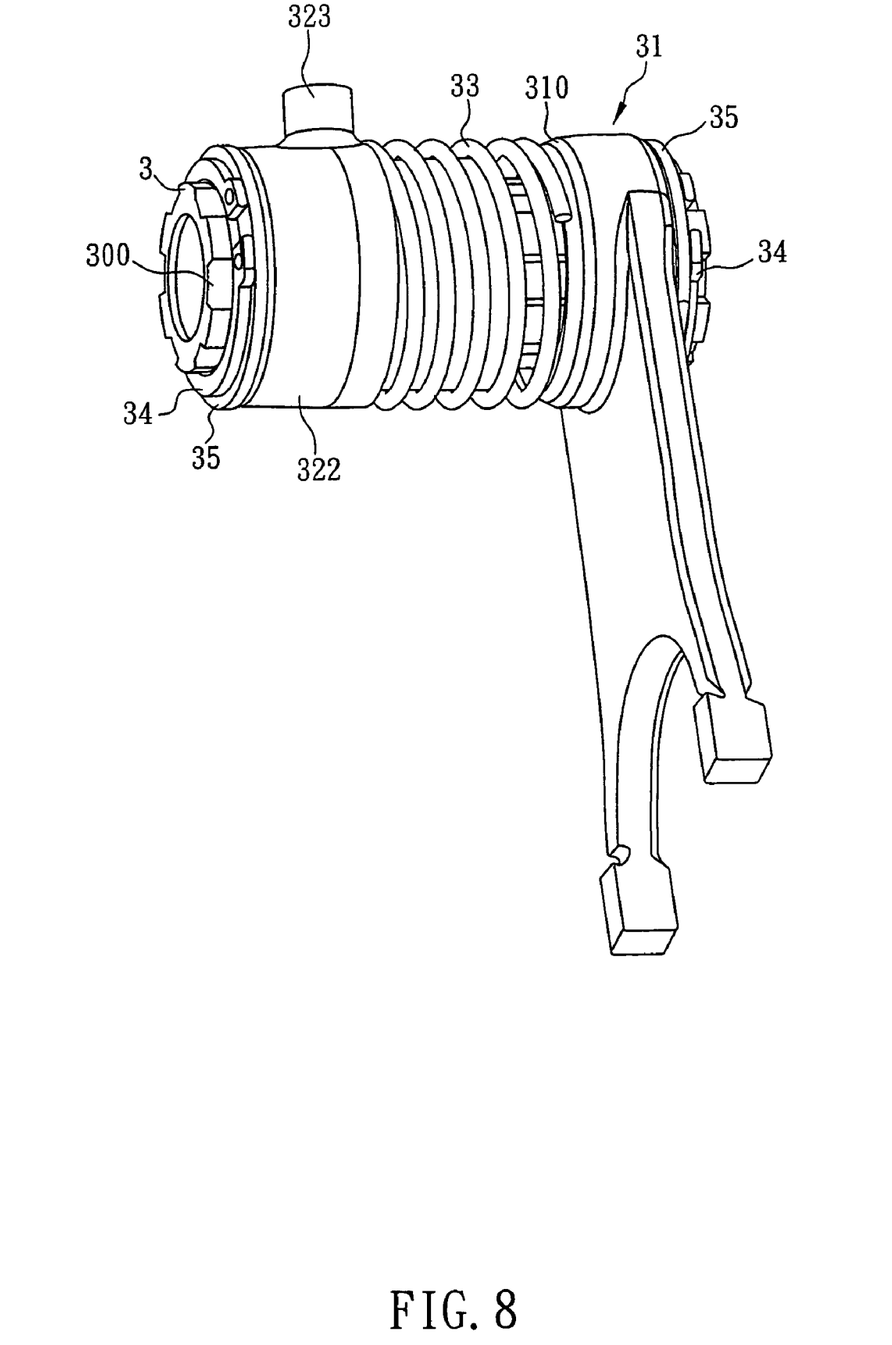
FIG. 8 is a perspective view of the assembled gearshift fork assembly of FIG. 7.
Figure 9:
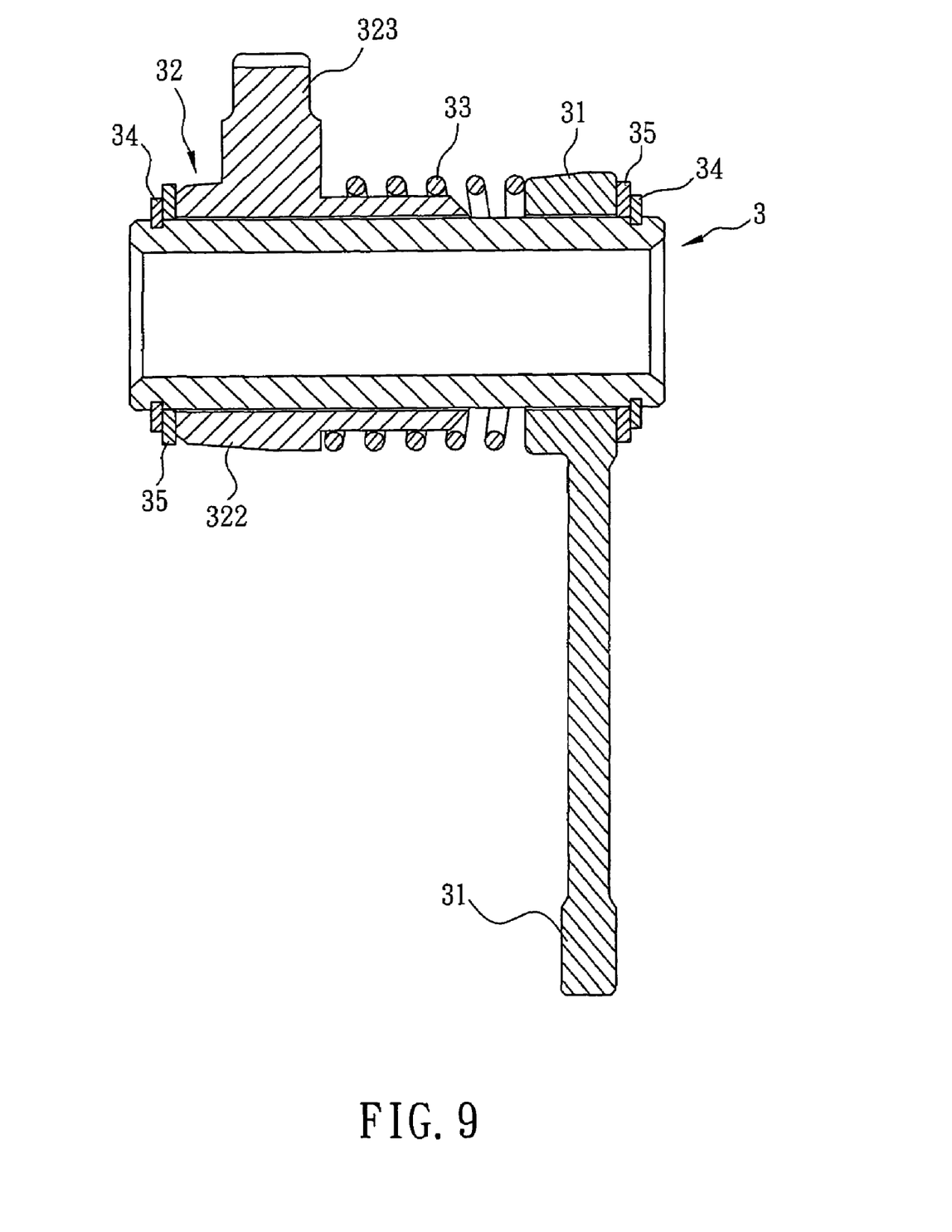
FIG. 9 is a sectional view of FIG. 8.

Referring to FIGS. 6, 7, and 8, a gearshift fork assembly for motor vehicle according to the invention is illustrated. The gearshift fork assembly is adapted to facilitate operation of the first gearshift fork section 221. The gearshift fork assembly is provided in the shaft for gearshift fork 22 of the gearbox 2. The gearshift fork assembly comprises a hollow body 3 put on the shaft for gearshift fork 22. On an outer surface of the hollow body 3 there is formed with a first engagement section 30. Around the outer surface of the hollow body 3 there are provided a gearshift fork 31, a sleeve 32, and a resilient member (e.g., spring) 33. The gearshift fork 31 is put on one end of the cylindrical hollow body 3. The gearshift fork 31 comprises a ring 310 at one end, the ring 310 including a second engagement section 311 on its inner surface, the second engagement section 311 adapted to lockingly mesh with the first engagement section 30 so as to fasten the gearshift fork 31 and the hollow body 3 together. The sleeve 32 is put on the other end of the hollow body 3. A third engagement section 320 is formed on an inner surface of the sleeve 32, the third engagement section 320 adapted to lockingly mesh with the first engagement section 30 so as to fasten the sleeve 32 and the hollow body 3 together. The resilient member 33 is biased between the ring 310 and the sleeve 32. By configuring as above, the gearshift fork 31, the sleeve 32, and the hollow body 3 are fastened together and thus the first gearshift fork section 221 is adapted to smoothly shift gears.

Referring to FIGS. 6, 7, and 8 again, in a preferred embodiment of the invention the first engagement section 30 is comprised of a plurality of grooves 300 extended from one end of the hollow body 3 to the other end thereof. The second engagement section 311 is comprised of a plurality of projections 312 extended from one end of the ring 310 to the other end thereof. The projections 312 are dimensioned and shaped to fit snugly in a portion the grooves 300. The third engagement section 320 is comprised of a plurality of protrusions 321 extended from one end of the sleeve 32 to the other end thereof. The protrusions 321 are dimensioned and shaped to fit snugly in an opposite portion of the grooves 300. A structural strength of the first gearshift fork section 221 is greatly increased due to the locking engagements of both the protrusions 321 and the projections 321 in the grooves 300. Further, conventional drawbacks associated with the gearshift fork including components loosening on sleeve, unbalanced force exerted by gearshift fork, not smooth operation in shifting gears, and even jam are eliminated.

Referring to FIGS. 6, 7, and 8 again, in the preferred embodiment of the invention on an outer surface of the sleeve 32 there are provided an annular enlargement 322 and a cylindrical protuberance 323. The enlargement 322 is put on the other end of the sleeve 32 distal the gearshift fork 31. One annular end of the enlargement 322 facing the gearshift fork 31 is urged by the other end of the resilient member 33. Thus, the sleeve 32 is adapted to slide by the compression or expansion of the resilient member 33. The protuberance 323 is projected from an outer surface of the enlargement 322 facing the speed changing case 21 and is fitted in the first groove 211. As a result, the sleeve 32 is adapted to activate the speed changing case 21 to cause the gearshift fork to shift gears.

Referring to FIGS. 6, 7, and 8 again, in the preferred embodiment of the invention the hollow body 3 comprises a plurality of equally spaced, curved troughs 301 around its either end. Each of two C-shaped positioning rings 34 is tightly fitted around the troughs 301 at either end of the hollow body 3. Each of two washers 35 is provided proximate either positioning ring 34 with the resilient member 33 disposed therebetween. The provision of the washers 35 aims at preventing the positioning rings 34, the gearshift fork 31, and the sleeve 32 from being quickly worn during operation. By disposing the gearshift fork 31, the resilient member 33, and the sleeve 32 around the hollow body 3 and between two ends of the hollow body 3, components associated with the first gearshift fork section 221 are prevented from being loosened.

By configuring as above, the driven gear 213 can be driven by the drive gear 262 of the gearshift lever 26. And in turn, the speed changing case 21 is adapted to enter into drive gear H, overdrive gear L, or reverse gear R. Referring to FIG. 6 specifically, in response to the speed changing case 21 entering into the drive gear H, the second gearshift fork section 223 does not push the second sliding block 242 and the first gearshift fork section 221 pushes the first sliding block 234. As such, the first sliding block 234 enters into a groove 2331 formed on the drive gear 233. And in turn, the drive gear 233 moves. It is understood that the positioning rings 34 are provided at both ends of the hollow body 3. Hence, the gearshift fork 31 is stopped by the positioning ring 34 and then moves toward the groove 2331 when the first gearshift fork section 221 moves toward the groove 2331. As a result, it is possible of quickly entering into the drive gear H rather than waiting a relatively long time of entering into the groove 2331 as experienced by the prior art.

Figure 10:
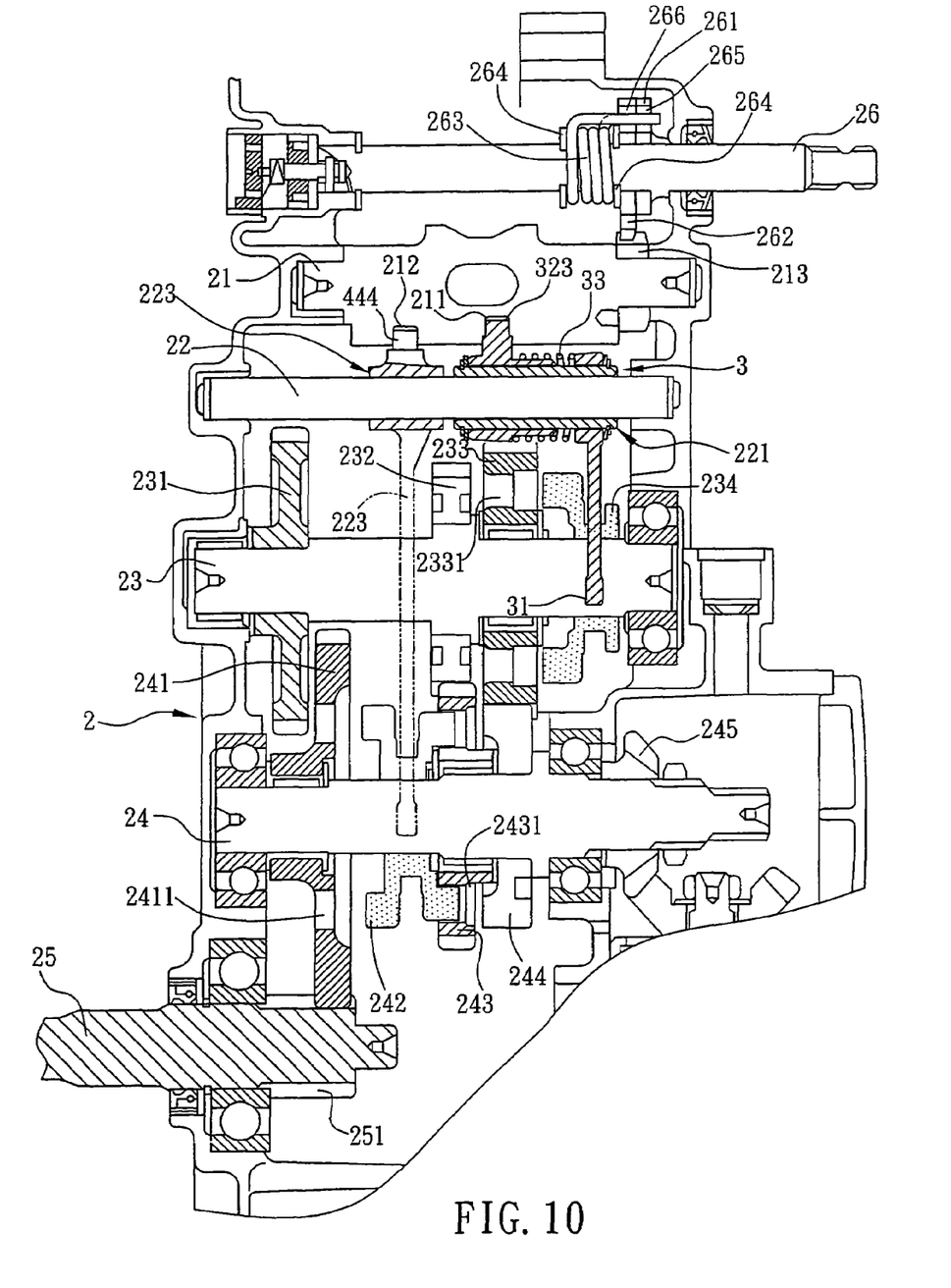
FIG. 10 is a sectional view of the gearshift in the gearbox according to the invention where the gearshift is in overdrive gear.
Figure 11:
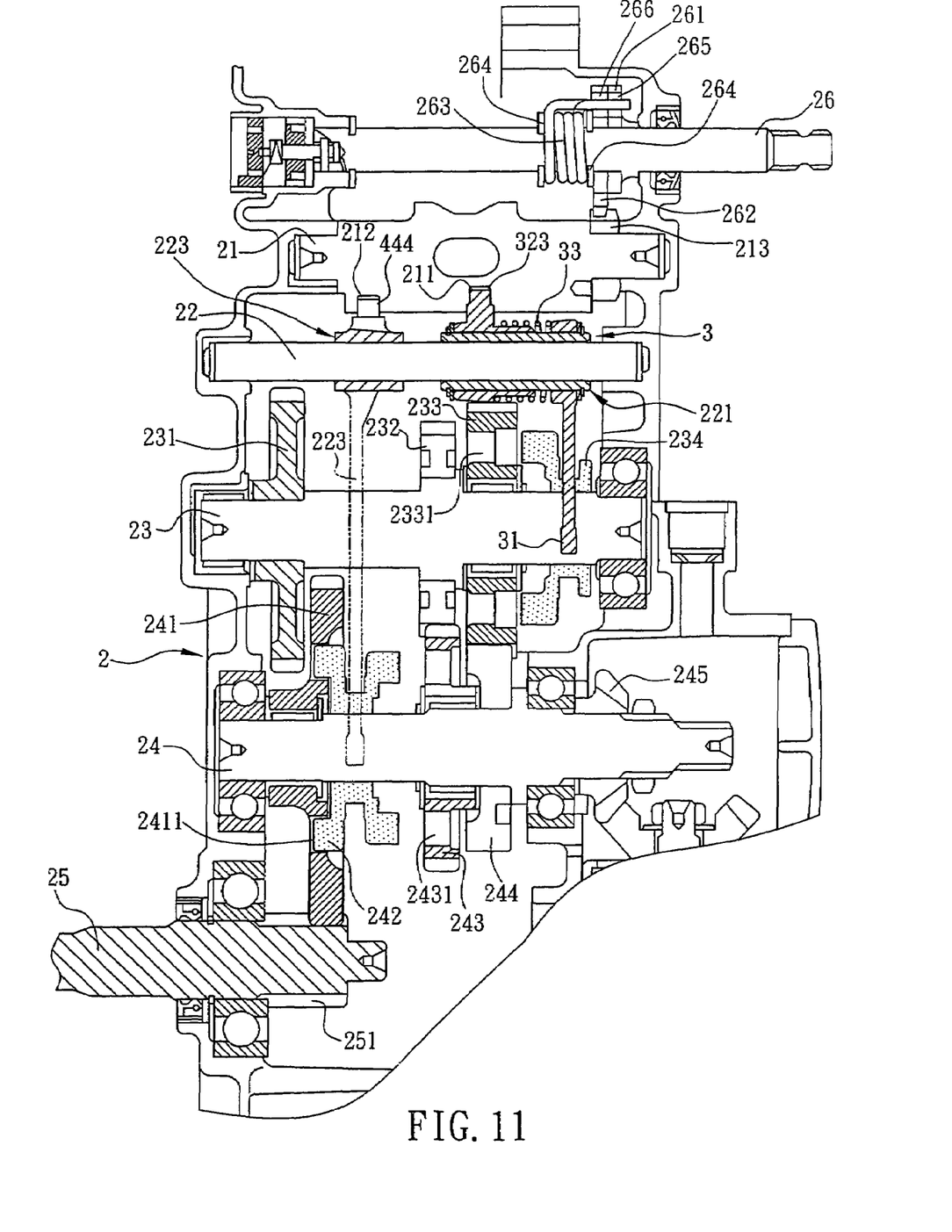
FIG. 11 is a sectional view of the gearshift in the gearbox according to the invention where the gearshift is in reverse gear.

Referring to FIG. 10, in addition in response to the speed changing case 21 entering into the overdrive gear L, the first gearshift fork section 221 does not push the first sliding block 234 and the second gearshift fork section 223 pushes the second sliding block 242 to cause it to enter into a groove 2431 formed on the linking gear for acceleration 243. And in turn, the linking gear for acceleration 243 moves. Referring to FIG. 11, in response to the speed changing case 21 entering into the reverse gear R, the first gearshift fork section 221 does not push the first sliding block 234 and the second gearshift fork section 223 pushes the second sliding block 242 to cause it to enter into a groove 2411 formed on the reverse gear 241.

By utilizing the gearshift fork assembly of the invention, the gearshift is able to change either from the reverse gear R to the overdrive gear L directly or from the overdrive gear L to the reverse gear R directly. That is, machining on the first groove 211 of the speed changing case 21 is eliminated. Also, the first gearshift fork section 221 is assembled as a unit without involving complicated machining and high manufacturing cost as experienced by the prior art. In addition, the first gearshift fork section 221 is robust. Hence, gear shifting is made quick and smooth. Moreover, not smooth operation of shifting gears and even jam due to unbalanced force exertion are eliminated.

While the invention herein disclosed has been described by means of specific embodiments, numerous modifications and variations could be made thereto by those skilled in the art without departing from the scope and spirit of the invention set forth in the claims.

What is claimed is:

1. A gearshift fork assembly mounted on a shaft for a gearshift fork in a gearbox of a motor vehicle, comprising:
   a hollow body put on the shaft for the gearshift fork, the hollow body comprising a first engagement section formed on its outer surface, wherein the first engagement section comprises a plurality of first grooves extended from one end of the hollow body to the other end thereof;
   the gearshift fork comprising a ring at one end, the ring put on one end of the hollow body, the ring including a second engagement section on its inner surface, the second engagement section adapted to mesh with the first engagement section, wherein the second engagement section comprises a plurality of projections extended from one end of the ring to the other end thereof, and the projections are adapted to fit in a portion of the first grooves respectively;
   a sleeve put on the other end of the hollow body, the sleeve comprising a third engagement section formed on its inner surface, the third engagement section adapted to mesh with the first engagement section, wherein the third engagement section comprises a plurality of protrusions extended from one end of the sleeve to the other end thereof, and the protrusions are adapted to fit in an opposite portion of the first grooves respectively; and a resilient member biased between the ring and the sleeve.

2. The gearshift fork assembly of claim 1, wherein the sleeve comprises:
- an annular enlargement formed on its outer surface, the enlargement put on the other end of the sleeve distal the gearshift fork wherein one end of the enlargement facing the gearshift fork is urged by the other end of the resilient member; and
- a cylindrical protuberance formed on its outer surface, the protuberance fitted in a second groove on a surface of a speed changing case in the gearbox proximate the shaft for the gearshift fork.

3. The gearshift fork assembly of claim 2, wherein the hollow body further comprises a plurality of spaced, curved troughs around its either end and two positioning rings each put around the troughs so as to fasten the gearshift fork, the sleeve, and the resilient member between two ends of the hollow body.

4. The gearshift fork assembly of claim 3, further comprising two washers each provided proximate either positioning ring with the resilient member disposed between the washers.

* * * * *